March 23, 1965     K. BERGER     3,174,776
JUNCTION BOX CONNECTOR WITH TONGUE MEANS TO EXCLUDE PLASTER
Filed Dec. 29, 1961
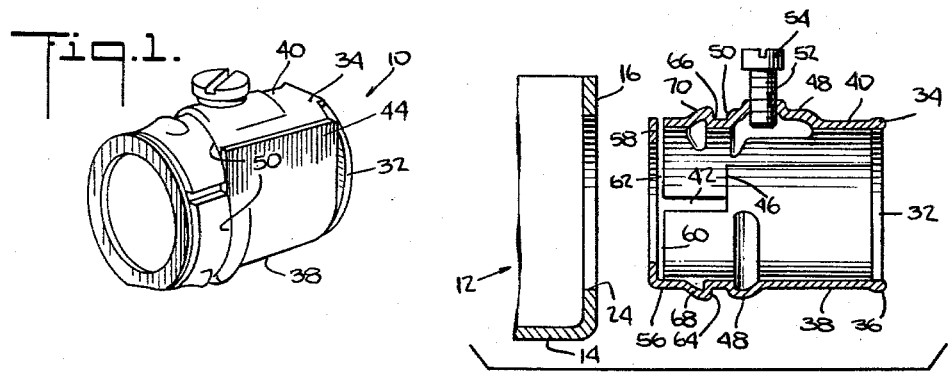
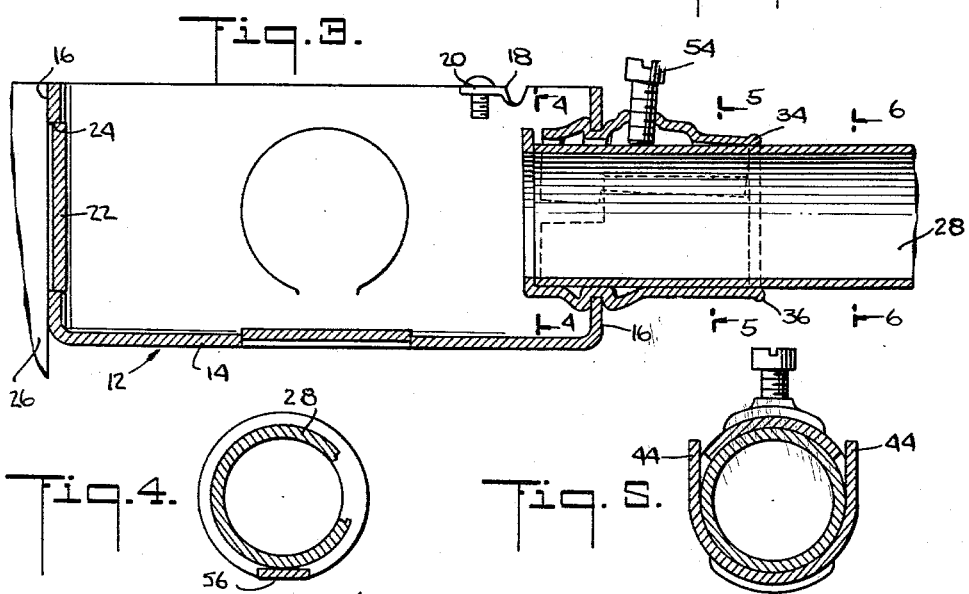
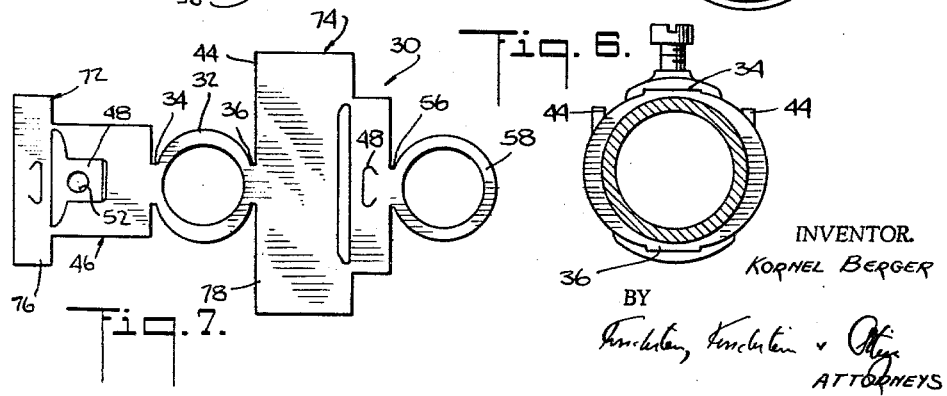
INVENTOR.
KORNEL BERGER
BY
ATTORNEYS

United States Patent Office 3,174,776
Patented Mar. 23, 1965

3,174,776
JUNCTION BOX CONNECTOR WITH TONGUE
MEANS TO EXCLUDE PLASTER
Kornel Berger, Queens County, N.Y. (% Berger
Machine Products Inc., 74—16 Grand Ave., Maspeth, N.Y.)
Filed Dec. 29, 1961, Ser. No. 163,293
5 Claims. (Cl. 285—162)

This invention relates to a junction box connector, i.e. a connector that is adapted to couple a metallic protective tube, such for example as a light-walled electrical conduit or an armored cable, to a junction box. The present invention is a continuation-in-part of my copending application Serial No. 77,122, filed December 20, 1960, for Junction Box Connector, now abandoned.

It is an object of my invention to provide a junction box connector that is simple, compact, foolproof and easy to use, and can be made inexpensively by a mass production method.

It is another object of my invention to provide a junction box connector which, except for a locking set screw, may be made entirely of a single piece of sheet metal.

It is another object of my invention to provide a junction box connector which, despite its simplicity of construction and low cost, can be mounted on a junction box without the use of tools by a mere thrusting operation, and which will be made fast to the box by turning the locking set screw that secures the protective tube to the connector.

It is another object of my invention to provide a junction box connector which will strongly resist deformation when an axial stress is imposed upon the protective tube.

It is another object of my invention to provide a junction box connector which when an axial thrust is applied to the protective tube in a direction which would tend to disengage said tube from the connector will be even more firmly coupled to the protective tube, in other words a junction box connector which will improve its grip on the protective tube when the tube has a force applied thereto which would tend to decouple it from the connector.

It is another object of my invention to provide a junction box connector which can be coupled or uncoupled in the field to or from a junction box and a protective tube by comparatively unskilled labor and with a minimum of training, indeed with partically no training at all.

Junction boxes and protective tubes for electrical wiring very often are imbedded in a hardenable mastic material such, for instance, as concrete or plaster. This material which is applied after the protective tube is secured to a junction box by a connector, is trowelled in place so that the material is subjected to an appreciable force during its application. Although the material is not liquid, it has a very low shear resistance and during the trowelling acts as a semi-liquid tending to intrude into all hollow spaces to which it is contiguous. Such material is alkaline in nature and will tend to deteriorate electrical wiring. On the other hand protective tubes and the openings in junction boxes are not manufactured to close tolerances. Accordingly heretofore conventional connectors have not been able to invariably prevent concrete or plaster from contacting the electric wiring that supposedly was protected, so that a hidden danger was created.

It is another object of my invention to provide a junction box connector which avoids the foregoing difficulty, that is to say, which is so constructed and arranged that it will substantially prevent ingress of semi-liquid substances, such as plaster or concrete, while they are being worked, i.e. trowelled.

It is an ancilliary object of my invention to provide a junction box connector in which the engagement between the connector and junction box, between the connector and conduit and between the parts of the connector itself externally of the junction box provide only cracks, i.e. very narrow spaces, for the possible intrusion of unset plaster or concrete.

It is another object of my invention to provide a junction box connector having parts which are relatively movable for insertion of the connector into the junction box and for tightening the connector onto the junction box and protective tube, and yet in which such relative movement does not open a gap between the parts which would permit ingress of unset plaster or concrete.

It is another object of my invention to provide a novel method and blank for making a one-piece junction box connector of the character described.

Other objects of my invention in part will be obvious and in part will be pointed out hereinafter.

My invention accordingly, consists in the features of construction, combinations of elements, arrangements of parts and series of steps which will be exemplified in the junction box connector, the blank and the method hereinafter described and of which the scope of application will be indicated in the appended claims.

In the embodying drawings in which is shown one of the various possible embodiments of my invention, FIG. 1 is a perspective view of a junction box connector constructed in accordance with my invention and shown apart from a junction box and protective tube;

FIG. 2 is a vertical sectional view of said connector and a fragmentary sectional view of an associated junction box as the connector is being approached to and aligned for coupling with said box;

FIG. 3 is a vertical sectional view of said connector in coupled engagement with the junction box;

FIGS. 4, 5 and 6 are transverse sectional views taken substantially along the lines 4—4, 5—5, and 6—6, respectively, of FIG. 3; and FIG. 7 is a plan view of a blank from which the junction box connector is formed.

Referring now in detail to the drawings, and more particularly to FIGS. 1–6, the reference numeral 10 denotes a junction box connector made in accordance with and embodying my invention and adapted to be detachably secured with great ease and speed to a conventional junction box 12. The box 12 that has been shown in the drawings is one of a conventional type that is formed from sheet metal and includes a base 14 around the periphery of which upright side walls 16 extend. Plural ears 18 protrude inwardly from the free edges of the side walls 16, said ears being provided with screws 20 that engage tapped openings (not shown) in the ears in order to secure a cover plate (not shown) to the junction box. The base 14 and side walls 16 of the junction box include the usual knock-out discs 22 each of which is a metal wafer that has been partially sheared from the junction box and retains only a fragmentary connection with said box so that if the disc is struck smoothly it will be broken away from the box to leave an opening 24 for a reception of a junction box connector 10. The junction box is adapted to be held in place in any suitable manner, for example, by driving a nail into a stud 26 through a small hole provided for this purpose either in the base or in a side wall of the box.

A junction box is provided for the purpose of physically covering and protecting the electric connection between two or more electrical wires, or between one or more electric wires and an electric device, such for instance as a switch, a fuse box or an outlet; hence the term "junction box" embraces outlet boxes and all other types of electric boxes in which electric connections are effected. Local regulations or insurance often require that the electric wires be protected, as by armoring, e.g., BX cable, or by a light-walled conduit. It is the purpose of my present novel connector 10 to make a mechanical joint between the protective tube 10 (armoring) and the junction box which joint will be rugged and strong and substantially impervious to the admission of concrete or plaster. An end of a run of light-walled conduit 28 has been shown herein by way of illustration, the preferred use of my connector being in conjunction with such conduit since it is in this form of my invention that the highest degree of exclusion of plaster and cement is obtained. However my invention also is applicable for use with BX (armored, flexible) cable although in such instance there is substantially greater possibility of the admission of concrete or plaster. The openings 24 which are provided upon knocking-out the discs 22 customarily are dimensioned to have a diameter somewhat larger than the external diameter of the light-walled conduit 28 in order to admit some form of a junction box connector in the form of a telescoping sleeve that forms part of a tube-to-box connector.

A junction box connector 10 embodying my present invention preferably is made from a single piece 30 of sheet metal (see FIG. 7) that, as finally formed, includes seven integrated parts bearing a certain relative physical relationship.

The first part is a flat base annulus 32 the inner diameter of which is a nice slidable fit for conventional light-walled tubing, i.e. for the light-walled conduit 28. This annulus is unbroken, that is to say, complete; hence it is rigid and thereby is able to form a sturdy shape-maintaining base for supporting the other six parts of the connector 10 for movement relative thereto in a predetermined manner that will be described hereinafter. Particular attention is called to the fact that the large central circular opening of the annulus 32 is shaped and dimensioned to pass the light-walled conduit 28 and not to obstruct its passage; therefore when the completed connector 10 is used for connection to the junction box 12 the end of the connector at which the annulus 32 is located is exposed, i.e. will be external to the junction box. This is in contradistinction to previous junction box connectors in which the corresponding unbroken annulus is arranged to be located internally of the junction box. It will be seen hereinafter that by disposing the unbroken annulus outside of the junction box an important step has been taken to prevent admission of wet plaster or cement into the connector or into the junction box.

The second and third parts of the junction box connector 10 are identical joining means such as squat legs 34, 36 which in the finished connector are located on diametrically opposite sides of the base annulus 32 and extend in the same general direction perpendicular to the plane of said annulus. Because the connector is made of sheet metal, preferably steel, and because the legs 34, 36 are flat and narrow, said legs are relatively flexible and resilient whereby the parts of the connector carried by the legs can be flexed with respect to the flat base annulus 32.

The fourth and fifth parts of the connector are, with certain exceptions that later will be pointed out, mirror images of one another. These parts are essentially semi-cylindrical in shape and have substantially the same radius of curvature. They are arranged to be held by the legs in positions substantially concentric about a single axis which constitutes the longitudinal axis of the junction box connector 10. Moreover said semi-cylindrical parts are coextensive, have their concave faces opposed and are adjacent one another so as mutually to define a short tube, that is to say a sleeve or nipple with longitudinal splits at its opposite sides; hence I have called these two parts "half tubes" 38, 40. Each tube is supported at the center of an end thereof by a different squat leg 34 or 36 so that the half tubes can, independently of one another, be flexed through a short arc relative to the base annulus 32 the arc being centered at the squat leg 34 or 36 as the case may be.

When the finished connector 10 is not stressed, that is to say is in the condition illustrated in FIG. 1, the two half tubes are held by the annulus 32 and legs 34, 36 in a position to jointly form a tube the inner diameter of which is substantially equal to the inner diameter of the base annulus. For convenience of reference the end of the connector 10 constituting the flat base annulus 32 will be referred to as the "rear" or "back" of the connector and the other end as the "front." At the front end of the connector the two half tubes are not each fully semi-circular in cross-section, each lacking a few degrees thereof so that in the unstressed, i.e. idle, condition the longitudinal edges of the front ends of the half tubes are mutually spaced apart to define linear slots 42. These slots are located on diametrically opposite sides of the connector and extend longitudinally thereof.

The rear portions of the half tubes 38, 40 between the portions thereof which define the slots 42 and the flat annulus 32 similarly are formed into substantially semi-cylindrical contours. However at these rear portions the half tubes differ from one another in that one half tube 38 includes a tongue 44 at each longitudinal edge thereof which tongues run from the front portions all the way to the base annulus. The two tongues are located at diametrically opposite sides of the connector and extend tangentially away from the longitudinal edges of the half tube 38. This rear portion of the half tube 38 is a full 180° so that the tongues 44 on the different sides of the connector are substantially parallel to one another (see FIG. 5). The tongues are flat, this being in contrast to the cylindrical curvature of the remainder of the rear portion of the half tube 38, however, the tongues are integral with said half tube, that is to say, in one piece therewith.

The corresponding (matching) rear portion of the half tube 40 is provided with a notch 46 at each longitudinal edge thereof, the notches, like the tongues 44, thereby being located on diametrically opposite sides of the connector.

The rear edge of each notch and the rear edge of each tongue is at the rear edge of the associated half tube and, accordingly, is immediately adjacent, i.e. juxtaposed to, the front face of the flat base annulus 32. The front edge of each notch and the front edge of each tongue is at that transverse zone of the connector which is immediately adjacent, i.e. juxtaposed to or flush with, the external surface of a junction box when the connector is secured thereto. It will be pointed out hereinafter how this arrangement of the parts effects the exclusion of wet plaster or concrete.

Each tongue at a given side of the connector is associated with a notch at the same side of the connector and the associated tongue and notch are of the same length parallel to the axis of the connector. The rear edge of each tongue is effectively immediately adjacent the front surface of the flat base annulus and the front edge of each tongue is in rubbing engagement with or at least immediately adjacent the front edge of the associated notch. Due to the fact that the notches represent cut outs in the half tube 40 in which they are formed and to the fact that the tongues extend right into and through the notches there is substantially no space between the front and rear ends of the tongue and the body of the connector which in this case, constitutes the front edges of the notches and the front face of the base annulus. Moreover, the depth of each notch is such as to snugly accommodate the tongues, or phrased differently, the inner face of each tongue rubs against or at least is immediately juxtaposed to the longitudinal edge of the associated notch as is shown in FIG. 5.

Thus when the connector is idle the engagement between the tongues, the notches and the flat annulus are such as to effectively provide no broad spaces or gaps through which wet plaster or cement can intrude under pressure. Furthermore, it will be apparent that as the half tubes are slightly sprung together or apart from such idle condition, these operations being necessary to proper utilization of the connector as will be pointed out hereinafter, the inward and outward motions of the two half tubes toward and away from one another will not open a space between the two half tubes in the regions spanned by the tongues and notches.

In the first place movement of the two half tubes apart from or toward one another through a few degrees simply will cause the front edge of each tongue to rub along the front edge of the associated notch and in the second place such movement will cause the inner face of each tongue to rub along the longitudinal edge of the associated notch. A slight space is present in idle condition between the rear edge of each tongue and the front face of the plane base annulus 32 to permit a small closing movement of the half tubes and opening movement of said tubes will enlarge this space to an insignificant degree. But this space even when enlarged is so narrow that it will not tend to permit wet plaster or cement to be squeezed therethrough. Attention is directed to the fact that motion of the rear edges of the tongue is minimized because they are practically at the pivot points of the tongues. In any event the very narrow spaces at the rear edges of the tongues are located at the part of the connector which is furthest from the junction box so that even if, as is not likely, a small quantity of plaster or cement should find its way through these spaces it would not be sufficient to reach into the junction box where its presence could be harmful.

It thus will be apparent that the combined cooperative action of the tongues, notches and base annulus to prevent entry of wet concrete or plaster into the junction box is dependent upon (a) the juxtaposition of the front edges of the tongues to the front edges of the notches, (b) the juxtaposition of the inner faces of the tongues to the longitudinal edges of the notches, (c) the juxtaposition of the rear edges of the tongues to the front face of the flat base annulus; and (d) the longitudinal extension of the tongues and notches all the way from the flat base annulus forwardly to the region of the connector which when the latter is installed will be flush with the outer face of the junction box.

Each half tube 38, 40 has an outwardly indented protuberance 48 the front edge of which is contoured to fashion an insertion limiting shoulder 50, i.e. a steep front surface substantially perpendicular to the longitudinal axis of the connector and facing away from the base annulus 32. The shoulders on the two half tubes are on diametrically opposite sides of the connector and lie in a common plane perpendicular to the longitudinal axis of the connector whereby they can function as abutments to limit insertion of the connector in an opening 24 in the junction box by striking the outer surface of a side wall or bottom wall thereof. Inasmuch as these shoulders 50 define the zone on the connector which will be immediately adjacent, i.e. effectively flush with, the external surface of the junction box, said shoulders 50, the front edges of the notches and the front edges of the tongues lie in a common plane perpendicular to the longitudinal axis of the connector.

One of the protuberances 48 extends rearwardly further than the other and is pierced to provide a hole 52 which is tapped to receive a locking set screw 54 that in idle condition of the connector has its longitudinal axis perpendicular to the longitudinal axis of the connector. The inner tip of the set screw is provided with the usual annular chisel operative edge or a point which may be hardened and which is adapted to bite into the external surface of a section of thin-walled electrical protective conduit inserted into the connection.

It will be appreciated from the foregoing description that the two half tubes 38, 40 in effect constitute the main body of the connector 10 and that this body is subdivided into a forward portion and a rear portion the zone between which is marked by the plane including the abutment shoulders 50 and the front edges of the tongues and notches. The rear portion, i.e., from said plane rearwardly, is external to a junction box when the connector is installed, while the front portion is contained within the junction box, being principally located internally of the junction box and also being disposed within an opening 24. It is because the linear slots 42 are located in the forward portion that the presence of the longitudinal spaces created thereby does not deleteriously affect the operation of the connector. Since these slots are within the junction box itself they are not exposed to wet cement or plaster.

The sixth part of the connector 10 is another joining means such as a squat leg 56 which extends longitudinally forward from the front end of either half tube, as shown from the half tube 38 devoid of the set screw 54. Desirably the leg 56 is aligned with the leg 36, i.e. said leg 56 is located midway of the front edge of the half tube 38.

The seventh and last part of the connector 10 is a stop ring 58. The stop ring is an annular flat band the plane of which is perpendicular to the longitudinal axis of the connector. The outer diameter of the stop ring is no larger than the outer diameter of the sleeve formed by the cooperating half tubes 38, 40 in relaxed, i.e. unstressed, condition, these two diameters, as a matter of convenience, being approximately equal. The inner diameter of the stop ring 58 is smaller than the inner diameter of the light-wall conduit 28 or BX cable sheath to be used so that when the protective tube is thrust into the connector 10 through the plane base annulus 32 the limit of its insertion is fixed by abutment of the front end of such tube against the rear face of the stop ring 58. The stop ring is spaced from the forward ends of the half tubes by arcuate slots 60, 62 the breadth of which is equal to the length of the leg 56. It will be apparent that the presence of these slots is not detrimental inasmuch as they are located on the interior of a junction box where they are not exposed to semi fluid cement or plaster. The presence of these slots is not essential except to ease the relative movement of the half tubes. It is within the scope of my invention to have the front edges of the half tubes immediately juxtaposed with, i.e. to rub against, the rear face of the stop ring.

My connector further includes means to prevent it from being withdrawn from an opening 24 once the connector is installed. Said means constitutes a pair of rearwardly facing connector withdrawal limiting shoulders 64 on diametrically opposed sides of the connector, one such shoulder being provided on each of the half tubes. These shoulders, like the insertion limiting shoulders 50, preferably are substantially perpendicular to the longitudinal axis of the connector and both shoulders 64 lie in a common plane. The steep connector withdrawal limiting surfaces thus provided face toward the connector insertion limiting shoulders 50 so that each pair of opposed shoulders 50, 64 defines a semicircular groove 66. Each half tube has one such groove. The grooves are about equal in width to the thickness of a wall of the junction box and are circumferentially aligned.

Preferably the shoulder 50 extends around the half tube 38 from the base of one tongue 44 to the base of the opposite tongue, while the front edges of the tongues in effect constitute extensions of the ends of this shoulder (see FIG. 1). Moreover the shoulder 50 on the half tube 40 preferably extends from the base of one notch to the base of the opposite notch so that the shoulders 50 on both of the half tubes in cooperation with the front edges of the tongues effectively form a substantially complete circular abutment adapted to lie against the front face of a wall of the box around an opening 24 and thereby prevent flow of semi-fluid wet unset plaster or cement into the box through such opening.

In the idle condition of the connector 10 the diameter of the circle formed by the matching bases of the grooves 66 is approximately equal to the diameter of an opening 24. Hence the outer diameter defined by the radial extremities of the shoulders 64 is greater than the diameter of an opening 24. Accordingly, it is desirable to include means for urging the half tubes toward one another during the coupling of the front end of the connector to a junction box. Such means comprises a cam, preferably a pair of cams one associated with each half tube, at the front portion of the connector. As illustrated, one cam 68 constitutes a ramp-shaped, that is to say, axially wedge shaped, outer contour on the protuberance 48 of the half tube 38 which wedge tapers forwardly in longitudinal profile; the other cam 70 is a similar ramp-shaped outer contour on a protuberance raised on the half tube 40 immediately in front of the associated shoulder 64. With this construction the cams automatically will force the two half tubes toward one another when the forward end of the connector is pushed into an opening 24. The longitudinal slots 42 permit such inward movement and therefore are essential components of my connector.

When the groove 66 reaches the opening 24 the half tubes will spring apart by virtue of the resilience of the the legs 34, 36 since the half tubes themselves are rather stiff because of their curved shape. It should be mentioned that although the connector cannot be withdrawn accidentally from a junction box once it has been coupled thereto (installed) it can be retracted deliberately by squeezing the half tubes toward one another or by angling the connector and simultaneously pulling it outwardly. Either the squeezing or the angling action will force the half tubes together and permit their withdrawal when it is desired to release the connector.

I have drawn attention to the necessity of providing longitudinal separation, i.e. as furnished by the slots 42 in order to allow the opposed concentric similarly arched half tubes to approach each other when the connector is coupled to a junction box. But this separation would have an attendant disadvantage if it were located on the outside of the box because in such position it would permit ingress of wet plaster or cement. Nevertheless I have overcome this difficulty by locating the complete flat base annulus 32 about which the half tubes flex (pivot) externally of the box so that the longitudinal separation which is necessary is positioned within the box where it causes no difficulty and further by providing the cooperating notches and tongues heretofore described which allow the relative movement of the two half tubes externally of the box without forming any noticeable gap outside of the box through which either wet plaster or wet cement can enter.

To utilize a connector 10 I knock out a disc 22 to leave an opening 24. Then I push the front end of the connector into such opening. The stop ring 56 passes quite easily through the opening. However the shoulders 64 are too large to enter the opening. But, by virtue of the cam 68, 70, the simple thrusting action exerted on the connector is transformed into a radial inward force which constricts the front end of the connector, permitting the shoulders 64 to clear the opening 24 whereupon the half tubes will snap outwardly to urge the bases of the grooves 66 toward the peripheral circumference of the opening 24. Further inward motion of the connector is checked by the shoulders 50. The connector now is loosely coupled to the junction box; it cannot be withdrawn accidentally although it can be released by the purposeful manipulation heretofore described.

The light-wall conduit 28 thereupon is introduced into the connector until it at least has cleared the set screw 24 and usually until the inner end of the conduit abuts the stop ring 58. Once the tube is in position the connector 10 cannot be released from a junction box, even deliberately, since it fills the space defined by the two half tubes and prevents them from moving toward one another by an amount sufficient to enable the shoulders 64 to be retracted out of the opening 24.

Finally, the set screw 54 is tightened whereby the operative end thereof will bite into the external surface of the conduit 28. As this occurs the two half tubes are flexed slightly apart from the position occupied by them when relaxed so that the bases of the grooves 66 are firmly pressed against the inner edge of the opening 24 thus rigidly locking the connector to the junction box at the same time that the conduit is rigidly locked to the connector.

This spreading action of the two tubes cocks the half tube 40 outwardly with respect to the half tube 38 and with respect to the light-wall conduit 28. Such cocking although slight is definite and present. Since the set screw 54 is perpendicular to the half tube 40 it too will be cocked so that its head is angled slightly away from the junction box and its operative tip is angled toward the box. In other words, the set screw is tilted so that the angle between its longitudinal axis and the portion of the light-wall conduit outwardly of the point of contact is less than 90°. By virtue of this angular relationship as a stress is imposed upon the light-wall conduit tending to pull it out of the connector, said stress will have the effect of causing the set screw to bite even deeper into the light-wall conduit so that once the connection has been made it cannot be released thereafter except by deliberately loosening the set screw 54 and first withdrawing the conduit. This means that the connection is permanent and will not be adversely affected by expansion or contraction, or the pulling of the conduit or shifting of the concrete or plaster due to changes in ambient temperature.

The blank 30 from which the connector 10 is made is shown in FIG. 7. Said blank is formed, as by shearing, from a flat piece of sheet metal in which the base annulus 32 is formed by the blanking operation. The flat stock on diametrically opposite sides of the base annulus is, in the same blanking operation, cut out to the shape of coplanar ears 72, 74. One ear 74 includes a panel 76 joined to the base annulus 32 by the leg 34. The other ear 74 comprises a panel 84 joined to the base annulus by the leg 36.

The panel 76, although generally flat as formed, has the protuberance 48, the hole 52, the shoulders 50, 64, the grooves 66 and the notches 46 provided therein by dies during or after the blanking operation. Subsequently, said panel 76 is curled, that is to say, curved to the shape of the half tube 40 and swung 90° with respect to the plane of the flat annulus 32. Similarly, the panel 74 while still generally flat has the protuberance 48, the shoulders 50, 64, and the groove 66 formed therein and thereon. The panel 74 has in a common plane therewith as initially blanked, the leg 56 and the top ring 58. Subsequently, the panel 74 is curled to the shape of the half tube 38 and swung 90° and the leg 56 is bent through 90° to swing the stop ring 58 to near the end of the nipple now constituted by the two half tubes. As said two half tubes are brought together, the tongues enter the notches in the manner described hereinabove so as to effectively close the space between the two half tubes rearwardly of the insertion limiting shoulders 56, that is to say, externally of the junction box when the connector is coupled thereto.

It thus will be seen that I have provided a junction box connector, and a blank and method for making the same, which achieve the various objects of my invention and are well adapted to meet the conditions of practical use.

As various possible embodiments might be made of the above invention and as various changes might be made in the embodiment above set forth it is to be understood that all matter herein described or shown in the embody-

Having thus described my invention, I claim as new and desire to secure by Letters Patent:

1. A junction box connector comprising an unbroken base annulus at the rear end of the connector so that said annulus will be located externally of a junction box when the connector is coupled thereto, said base annulus having a front face, a split tube aligned with said annulus, a resilient leg integrally resiliently joining said split tube to said annulus, said split tube extending forwardly away from said annulus, means extending inwardly across the front end of the split tube and supported thereby and disposed to act as an abutment element for limiting forward insertion of a protective tube into the junction box connector through the base annulus, said split tube including an outwardly protruding forwardly facing insertion-limiting shoulder, means providing a tapped opening in the split tube, a screw meshing with said opening and having its tip exposed on the inside of the split tube, a tongue integral with a split edge of the tube in a position external to the junction box when the connector is coupled thereto, the forward edge of the tongue and the insertion limiting shoulder lying in about the same plane perpendicular to the longitudinal axis of the split tube, the rear edge of the tongue being juxtaposed to the front face of the base annulus, the tip of the tongue at least about overlying the outer surface of the opposed longitudinal split edge of the tube whereby to permit the two split edges of the tube to be flexed toward one another, and means providing a notch in said opposed longitudinal split edge of said tube through which notch the tongue extends, the front edge of the notch being registered with the front edge of the tongue and the rear edge of the notch constituting a portion of the front face of the base annulus, the inner surface of the tongue being juxtaposed to the longitudinal edge of the notch.

2. A junction box connector comprising an unbroken base annulus at the rear end of the connector so that said annulus will be located externally of a junction box when the connector is coupled thereto, said base annulus having a front face, a split tube aligned with said annulus, a resilient leg integrally resiliently joining said split tube to said annulus, said split tube extending forwardly away from said annulus, means extending inwardly across the front end of the split tube and supported thereby and disposed to act as an abutment element for limiting forward insertion of a protective tube into the junction box connector through the base annulus, said split tube including an outwardly protruding forwardly facing insertion-limiting shoulder and an outwardly protruding rearwardly facing withdrawal-limiting shoulder which two shoulders conjointly defined a groove, forwardly tapering wedge cam means at the front of the split tube, means providing a tapped opening in the split tube, a screw meshing with said opening and having its tip exposed on the inside of the split tube, a tongue integral with a split edge of the tube in a position external to the junction box when the connector is coupled thereto, the forward edge of the tongue and the insertion limiting shoulder lying in about the same plane perdendicular to the longitudinal axis of the split tube, the rear edge of the tongue being juxtaposed to the front face of the base annulus, the tip of the tongue at least about overlying the outer surface of the opposed longitudinal split edge of the tube whereby to permit the two split edges of the tube to be flexed toward one another, and means providing a notch in said opposed longitudinal split edge of said tube through which notch the tongue extends, the front edge of the notch being registered with the front edge of the tongue and the rear edge of the notch constituting a portion of the front face of the base annulus, the inner surface of the tongue being juxtaposed to the longitudinal edge of the notch.

3. A junction box connector comprising, an unbroken base annulus at the rear end of the connector so that said annulus will be located externally of a junction box when the connector is coupled thereto, said base annulus having a front face, a pair of opposed similarly arched concentric half-tubes extending forwardly away from said base annulus and mutually defining a longitudinally split tube of about the same diameter as the base annulus, a different resilient leg integrally resilient joining each half-tube to the base annulus, means extending inwardly across the front end of the split tube and supported by one of the half-tubes and disposed to act as an abutment element for limiting forward insertion of a protective tube into the junction box connector through the base annulus, each half-tube including an outwardly protruding forwardly insertion-limiting shoulder and an outwardly protruding rearwardly facing withdrawal-limiting shoulder which two shoulders conjointly define a groove, a forwardly tapering wedge cam at the front of each half-tube, means providing a tapped opening in one of the half-tubes, a screw meshing with said opening and having its tip exposed on the inside of the split tube, a tongue on a longitudinal edge of a half-tube at each split, said tongues being positioned external to the junction box when the connector is coupled thereto, the forward edges of said tongues and the insertion limiting shoulder lying in about the same plane perpendicular to the longitudinal axis of the split tube and the rear edges of the tongues being juxtaposed to the front face of the base annulus, the tip of each tongue at least about overlying the outer surface of a longitudinal edge portion of the other half-tube whereby to permit the half-tubes to be flexed toward one another, and means providing notches in said other half-tube through which the tongues extend, the front edges of the notches being registered with the front edges of the tongues and the rear edges of the notches constituting portions of the front face of the base annulus, the inner faces of the tongues being juxtaposed to the longitudinal edges of the notches.

4. A junction box connector as set forth in claim 2 wherein the insertion-limiting shoulders extend around the half-tubes from the forward edges of the tongues and notches at one longitudinal edge of each half-tube to the forward edges of the tongues and notches at the other longitudinal edge of each half-tube so that both such shoulders in cooperation with the tongues form a substantially complete annulus abutment adapted to lie against an outer face of a junction box and prevent admission of a semi-fluid solid into the box through the connector.

5. A junction box connector comprising, an unbroken base annulus at the rear end of the connector so that said annulus will be located externally of a junction box when the connector is coupled thereto, said base annulus having a front face, a pair of opposed similarly arched concentric half-tubes extending forwardly away from said base annulus and mutually defining a longitudinally split tube of about the same diameter as the base annulus, a different resilent leg integrally resiliently joining each half-tube to the base annulus, means extending inwardly across the front end of the split tube and supported by one of the half-tubes and disposed to act as an abutment element for limiting forward insertion of a protective tube into the junction box connector through the base annulus, each half-tube including an outwardly protruding forwardly facing insertion-limiting shoulder and outwardly protruding rearwardly facing withdrawal-limiting shoulder which two shoulders conjointly define a groove, a forwardly tapering wedge cam at the front of each half-tube, means providing a tapped opening in one of the half-tubes, a screw meshing with said opening and having its tip exposed on the inside of the split tube, a tongue on each longitudinal edge of one half-tube in a position external to the junction box when the connector is coupled thereto, the forward edges of said tongues and the insertion limiting shoulder lying in about the same plane perpendicular to the longitudinal axis of the split tube and the rear edges of the tongues being juxtaposed to the front face of the base annulus, the tip of each tongue at least about overlying the outer surface of longitudinal edge portion of the other half tube whereby to permit the half-tubes to be flexed toward one another, and means providing notches in said other half-tube through which the tongues extend, the front edges of the notches being registered with the front edges of the tongues and the rear edges of the notches constituting portions of the front face of the base annulus, the inner faces of the tongues being juxtaposed to the longitudinal edges of the notches.

References Cited by the Examiner

UNITED STATES PATENTS

| | | | |
|---|---|---|---|
| 1,644,296 | 10/27 | Thomas | 285—218 |
| 1,644,305 | 10/27 | Church | 285—218 |
| 1,644,307 | 10/27 | Ledbetter | 285—218 |
| 1,904,409 | 4/33 | Church. | |

FOREIGN PATENTS 459,529    9/49    Canada.

CARL W. TOMLIN, *Primary Examiner*.